United States Patent
Rana et al.

(10) Patent No.: US 7,822,189 B2
(45) Date of Patent: Oct. 26, 2010

(54) SEARCHING MULTIPLE DIRECTORIES AND GENERATING A SORTED INTEGRATED DIRECTORY

(75) Inventors: Hemendra Rana, San Jose, CA (US);
Saurav Chatterjee, San Jose, CA (US);
Paul Fullarton, San Jose, CA (US);
Steven D. Schramm, San Jose, CA (US)

(73) Assignee: Orative Corporation, San Jose, CA (US)

( * ) Notice: Subject to any disclaimer, the term of this patent is extended or adjusted under 35 U.S.C. 154(b) by 432 days.

(21) Appl. No.: 11/509,127

(22) Filed: Aug. 23, 2006

(65) Prior Publication Data

US 2007/0041556 A1     Feb. 22, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/710,998, filed on Aug. 23, 2005, provisional application No. 60/711,051, filed on Aug. 23, 2005, provisional application No. 60/711,053, filed on Aug. 23, 2005.

(51) Int. Cl.
*H04M 3/42* (2006.01)
*G06F 17/30* (2006.01)
(52) U.S. Cl. ..................... 379/218.01; 707/3
(58) Field of Classification Search ............ 379/218.01; 707/3–10
See application file for complete search history.

(56) References Cited

U.S. PATENT DOCUMENTS

| | | | |
|---|---|---|---|
| 5,732,348 | A | 3/1998 | Norimastsu |
| 5,903,629 | A | 5/1999 | Campbell |
| 6,092,097 | A | 7/2000 | Suzouka |
| 6,147,977 | A | 11/2000 | Thro |
| 6,272,214 | B1 | 8/2001 | Jonsson |
| 6,345,288 | B1 | 2/2002 | Reed |
| 6,351,656 | B1 | 2/2002 | Burgan |
| 6,373,817 | B1 | 4/2002 | Kung |
| 6,424,711 | B1 | 7/2002 | Bayless |
| 6,751,297 | B2 | 6/2004 | Nelkenbaum |
| 6,754,181 | B1 | 6/2004 | Elliott |
| 6,920,486 | B2 | 7/2005 | Kiiskinen |
| 7,039,622 | B2 * | 5/2006 | Chu .......................... 706/46 |

(Continued)

OTHER PUBLICATIONS

PCT International Search Report, International Application No. PCT/US2006/033181, Apr. 25, 2007.

(Continued)

*Primary Examiner*—Rasha S Al Aubaidi
(74) *Attorney, Agent, or Firm*—Tucker Ellis & West LLP

(57) ABSTRACT

Embodiments for searching multiple directories are described. The searching includes remote searching and local searching. Local searching is performed against the local integrated phonebook on a client device. In contrast, remote searching is performed against one or more directories or directory types of an enterprise server (e.g. corporate directory, etc.). The local directory on the client device therefore effectively functions like a cache of information of one or more of the directories of the enterprise server, where the cache is stored locally on the client device.

46 Claims, 14 Drawing Sheets

U.S. PATENT DOCUMENTS

| | | |
|---|---|---|
| 7,136,845 B2 * | 11/2006 | Chandrasekar et al. ......... 707/3 |
| 2003/0120593 A1 | 6/2003 | Bansal |
| 2004/0248600 A1 | 12/2004 | Kim |
| 2005/0041647 A1 | 2/2005 | Stinnie |
| 2005/0068980 A1 | 3/2005 | Mathew |
| 2005/0272413 A1 | 12/2005 | Bourne |
| 2006/0141982 A1 | 6/2006 | Timmins |
| 2007/0022058 A1 | 1/2007 | Labrou |
| 2007/0240081 A1 * | 10/2007 | Grossman et al. ........... 715/854 |
| 2008/0270220 A1 * | 10/2008 | Ramer et al. .................. 705/10 |

OTHER PUBLICATIONS

Written opinion of the International Searching Authority for Application No. PCT/US2006/033181.

PCT International Search Report, International Application No. PCT/US2006/033071, Apr. 20, 2007.

PCT International Search Report, International Application No. PCT/US2007/000487, Oct. 18, 2007.

PCT International Search Report, International Application No. PCT/US2007/007064, Jun. 30, 2008.

* cited by examiner

600

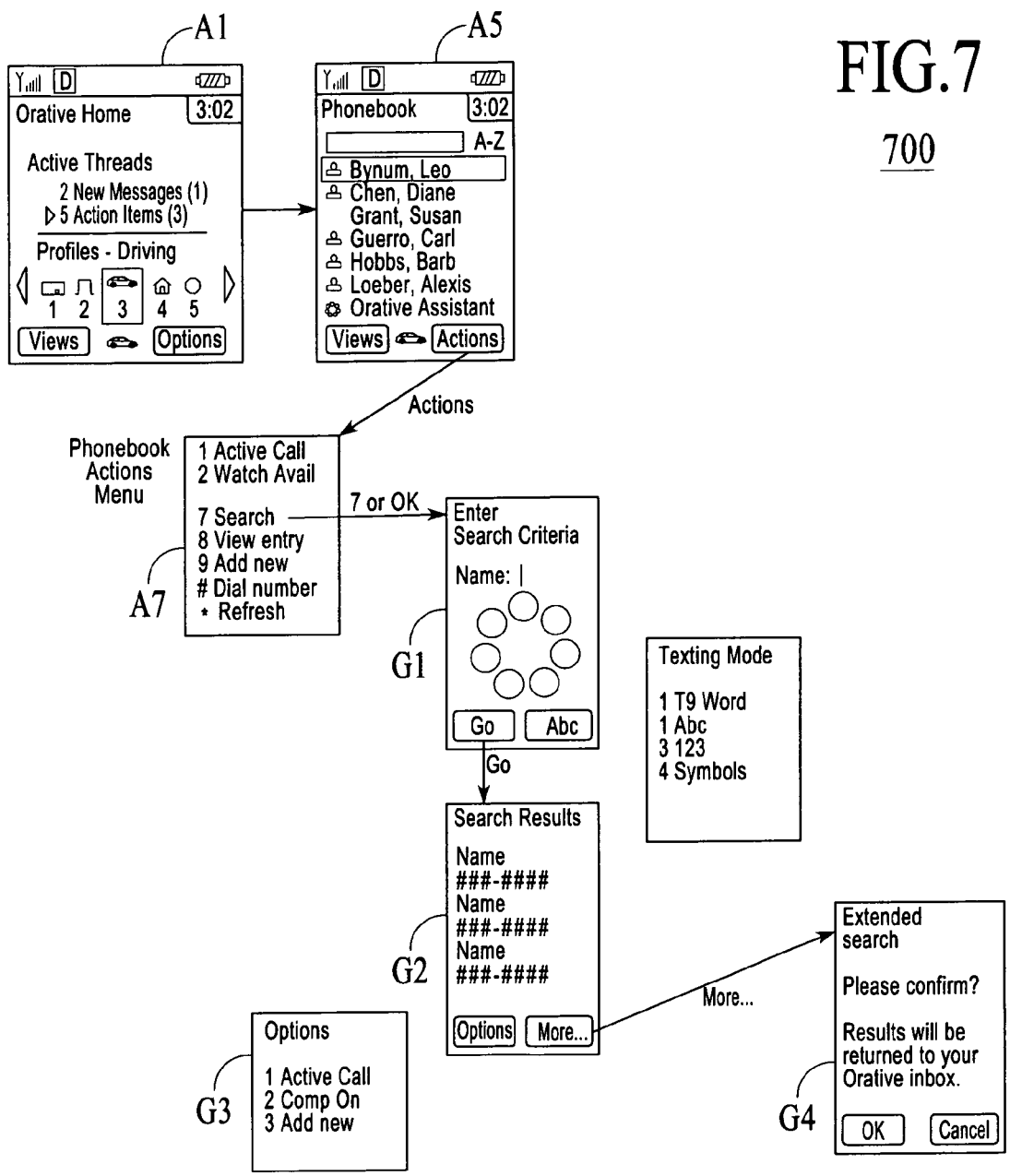
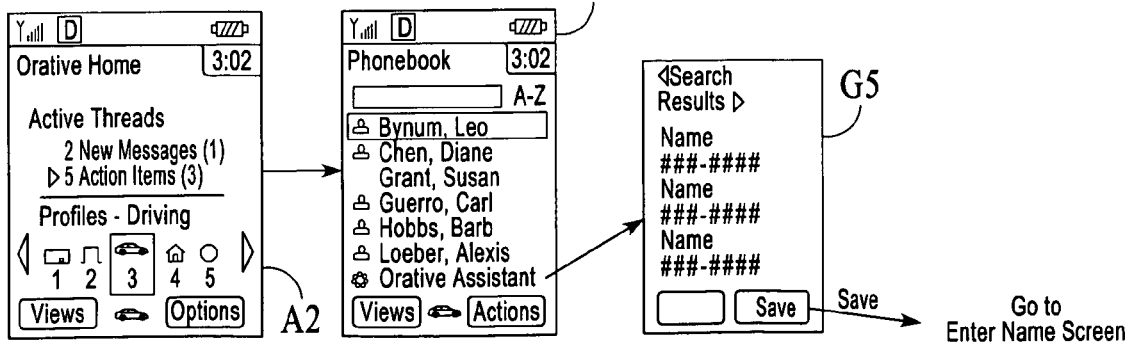
FIG.7
700

SEARCHING MULTIPLE DIRECTORIES AND GENERATING A SORTED INTEGRATED DIRECTORY

RELATED APPLICATIONS

This application is a continuation-in-part (CIP) application of U.S. patent application Ser. No. 10/890,922, filed Jul. 14, 2004, which claims the benefit of U.S. Patent Application No. 60/487,143, filed Jul. 14, 2003.

This application claims the benefit of U.S. Patent Application No. 60/710,998, filed Aug. 23, 2005.

This application claims the benefit of U.S. Patent Application No. 60/711,051, filed Aug. 23, 2005.

This application claims the benefit of U.S. Patent Application No. 60/711,053, filed Aug. 23, 2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 7 is a directory Search View tree of the AMC system, under an embodiment.

DETAILED DESCRIPTION

Embodiments for searching multiple directories are described. The searching includes remote searching and local searching. Local searching is performed against the local integrated phonebook on a client device. In contrast, remote searching is performed against one or more directories or directory types of an enterprise server (e.g. corporate directory, etc.). The local directory on the client device therefore effectively functions like a cache of information of one or more of the directories of the enterprise server, where the cache is stored locally on the client device.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

Figure 1:
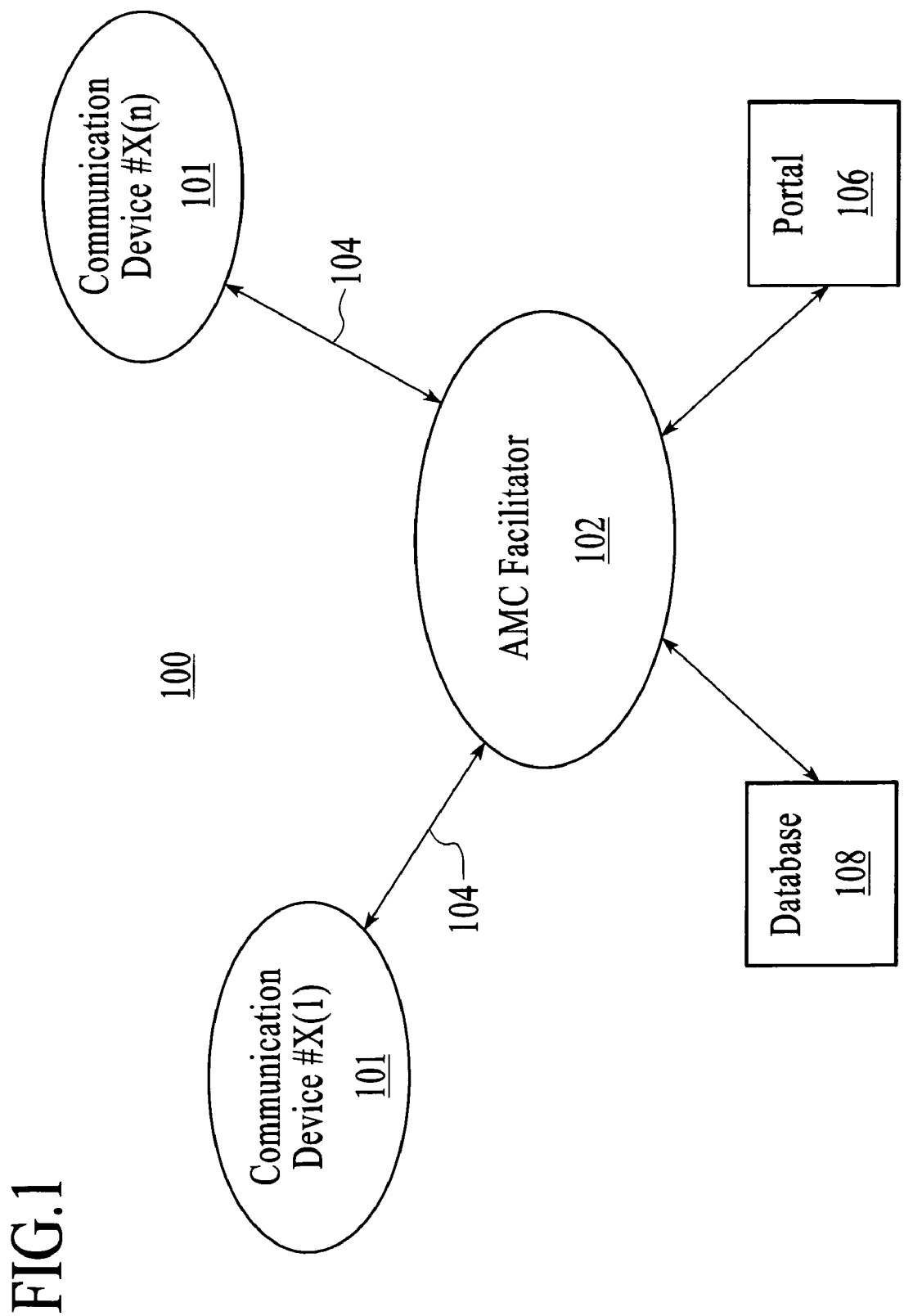
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as handsets, client devices, mobile devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
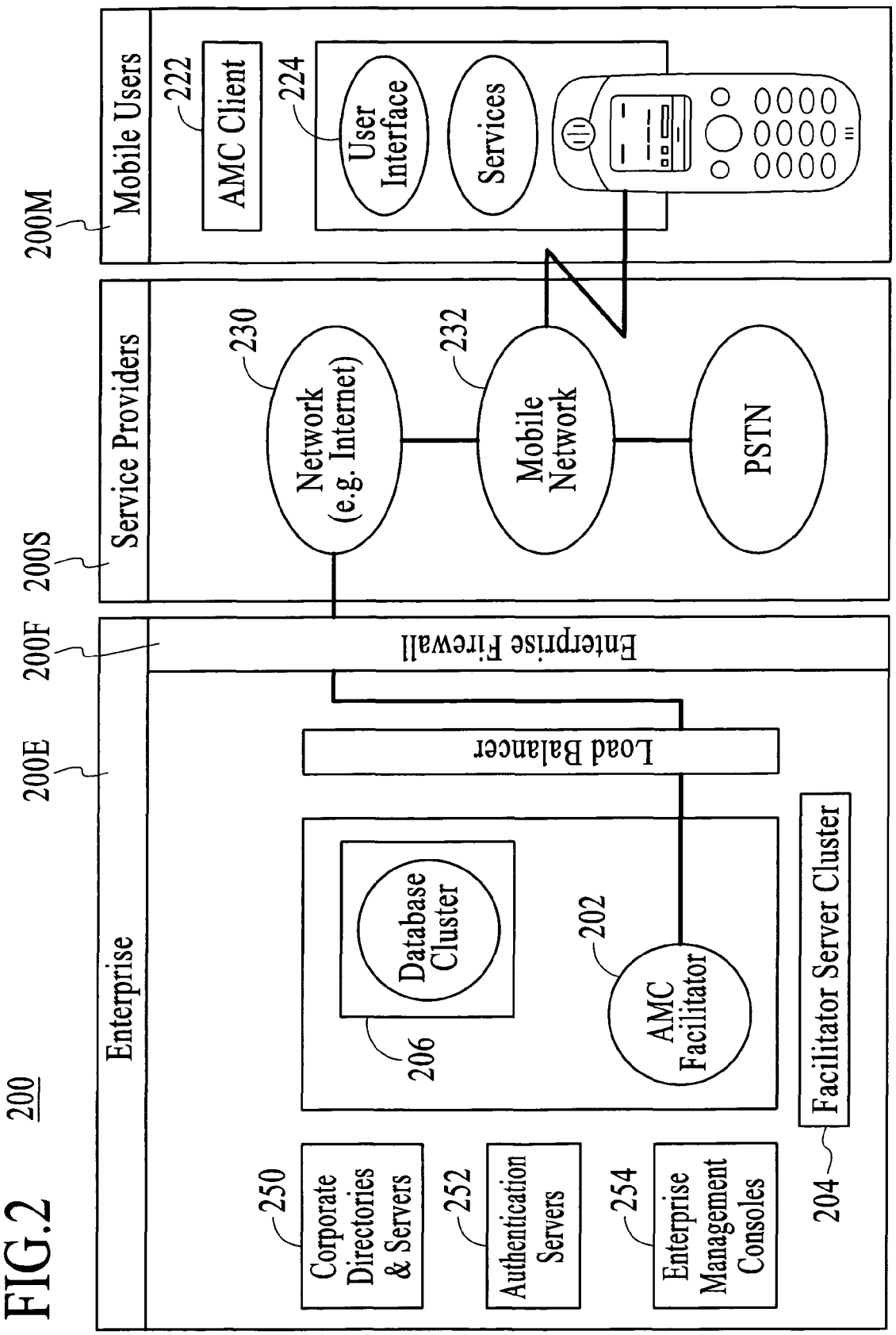
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes contact information, directory information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular client devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the client device native phonebook, and provide data coupling between those sources and client devices hosting the AMC client. This contact information is managed by providing the user with access via the client device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3:
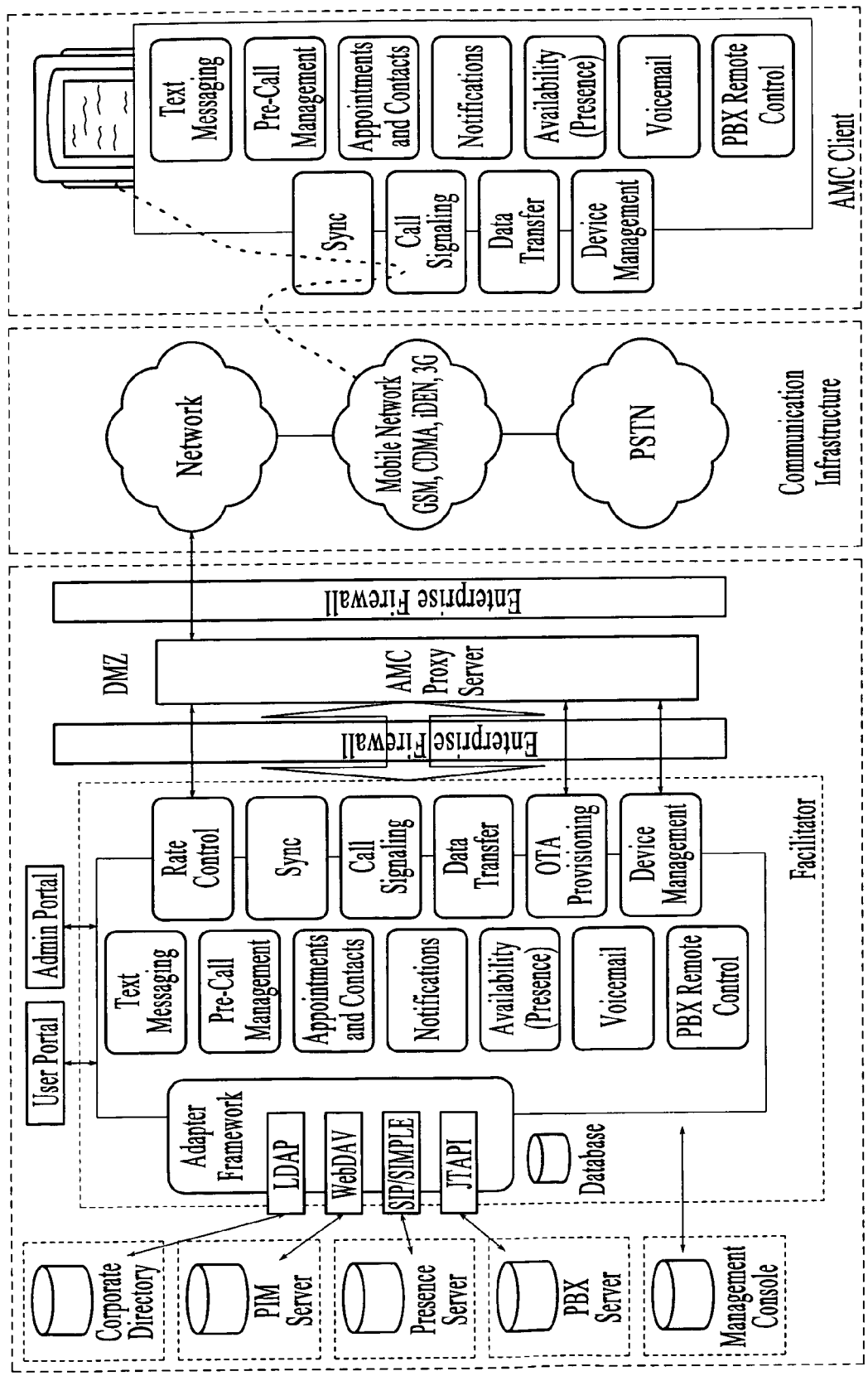
FIG. 3 is a block diagram of a communications system that includes an AMC system, under another alternative embodiment.

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, and management console.

The AMC system includes a facilitator as described herein. The facilitator includes an adapter or adapter framework by which the facilitator simultaneously integrates with components of the enterprise and enterprise servers. The facilitator uses an adapter for each directory server to which it integrates. The adapter of an embodiment is a protocol-specific adapter for each directory server to which it integrates; alternatively, the adapter includes vendor-specific adapters. The facilitator integrates with multiple directories simultaneously, including Lightweight Directory Access Protocol (LDAP)/Active Directory, Exchange, Domino, and third-party instant message (IM)/presence server buddy-lists. The AMC adapters convert the data from the enterprise directories (e.g. external) into a common data structure. The converted data is coalesced together into a single directory presented to the user on the client device via the client. The single directory generated from the data of multiple directories is referred to as the AMC phonebook.

The facilitator includes one or more applications that support multiple functions provided by the AMC system. The AMC system functions include, but are not limited to, test messaging, pre-call management, appointments and contacts, notifications, availability (presence), voicemail, and PBX remote control.

The facilitator couples to a client device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the client devices, provides a coupling to individual client devices.

Communications between the facilitator and the client device are controlled by the facilitator using one or more components and applications. The functions provided by the facilitator in controlling communications include one or more of rate control, synchronization (sync), call signaling, data transfer, OTA provisioning, and device management to name a few. Optionally, the communications path between the facilitator and the communications network includes an AMC proxy server.

Figure 4:
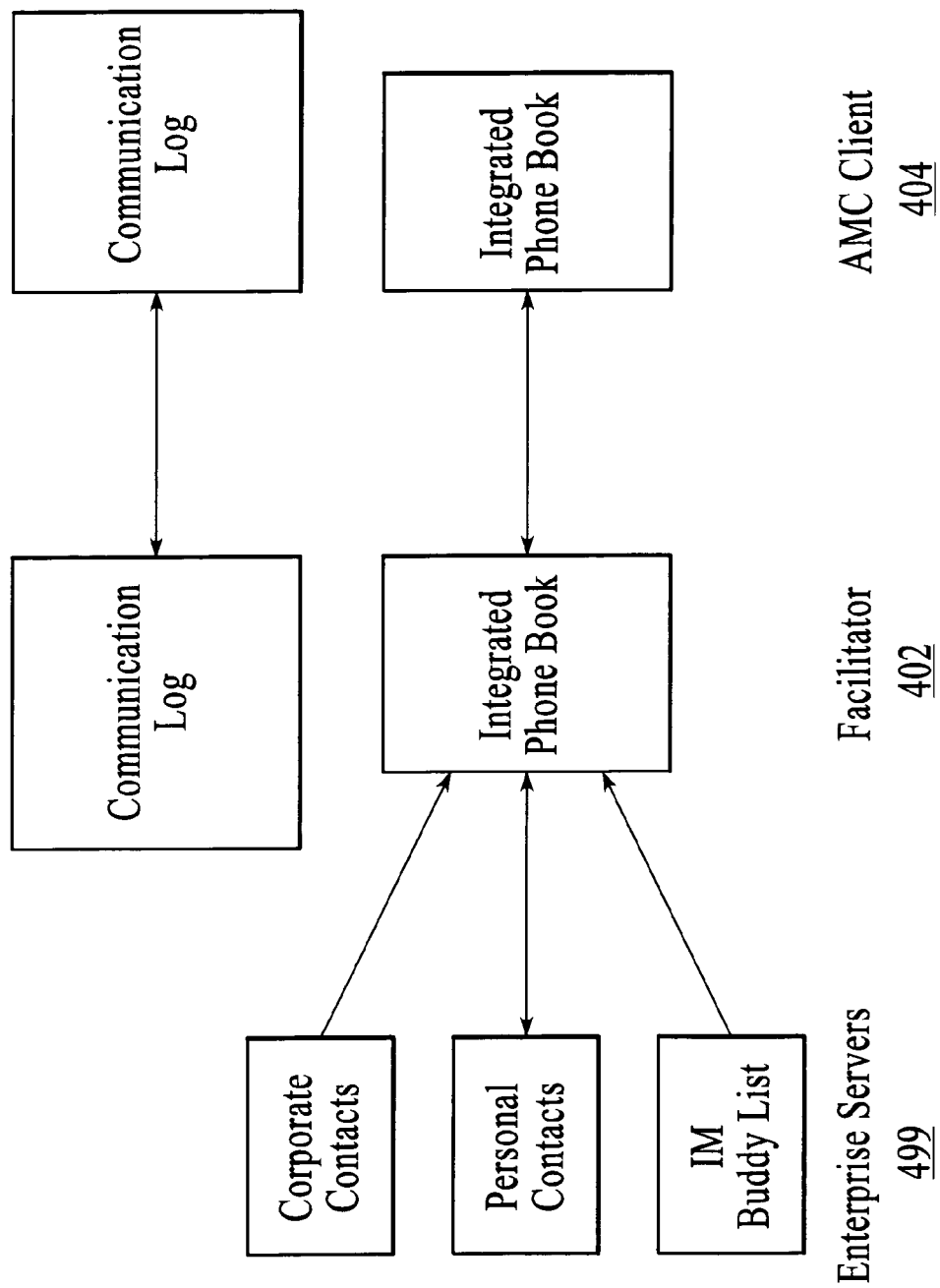
FIG. 4 is a block diagram of a contact data structure of the AMC system, under an embodiment.

The AMC system described above integrates contacts and contact information from multiple directories or contact lists. FIG. 4 is a block diagram of a contact data structure of the AMC system, under an embodiment. The data structure includes a communications log and an integrated phonebook on the facilitator 402 (e.g. appointments and contacts module of the facilitator (FIG. 3)) for each user. The integrated phonebook of the facilitator 402 receives or exchanges information with directories of one or more enterprise servers 499 for that user, the directories including corporate contacts, personal contacts, and instant messaging (IM) buddy lists, for example.

The client 404 also includes a communications log and an integrated phonebook, each of which are coupled to the respective data structures of the facilitator. The contact information of the integrated phonebook is stored in an application and/or memory area of the client device that includes the native phonebook of the client device, but can be stored in other memory areas of/available to the client device. Addition, modification, and/or deletion of contacts in the integrated phonebook reflect in the native phonebook of the client device, but are not so limited. Likewise, addition, modification, and/or deletion of contacts in the native phonebook of the client device are reflected in the integrated phonebook, but are not so limited.

The integrated phonebook of an embodiment includes a collection of contact objects, each of which represents a contact, whether one or more of corporate, personal and/or buddy list. The contacts in the integrated phonebook are a subset of contacts found in the enterprise servers. The integrated phonebook is specific to each user but is not so limited. The contacts in the integrated phonebook are selected manually, for example, by the user via one or more of the client and a user portal of the facilitator 402. Contacts are thus moved in and out of the integrated phonebook manually by the user through use of the user portal and/or from the client device (via remote search and add to phonebook; or delete from phonebook). Contacts with additional AMC context information may be indicated with an icon contact (e.g., availability, accessible communication modes), but are not so limited.

Contacts are added and removed from the communications log by the AMC system based on activity, including call requests, text messages, emails, voicemails, incoming phone calls, and/or outgoing phone calls. The communications log includes contacts are displayed chronologically, then alphabetically by name, in the communications log along with an icon that shows the AMC context information for the contact (e.g., availability, accessible communication modes), but is not so limited.

Both the communications log and the integrated phonebook provide the ability to view (and modify in case of the integrated phonebook) contacts as well as to select one or more contacts from the contact list and then select desired AMC calling or communications features for the selected contacts. Both provide graphical indications of the availability state (i.e., contextual cues) of each AMC contact as defined by the currently active availability profile of that contact. The AMC system updates the context data in the communications log when any subscriber represented in the lists change his availability or presence state, where the updates of an embodiment occur the next time the AMC client 404 and facilitator 402 communicate following the change in availability or presence state.

Figure 5:
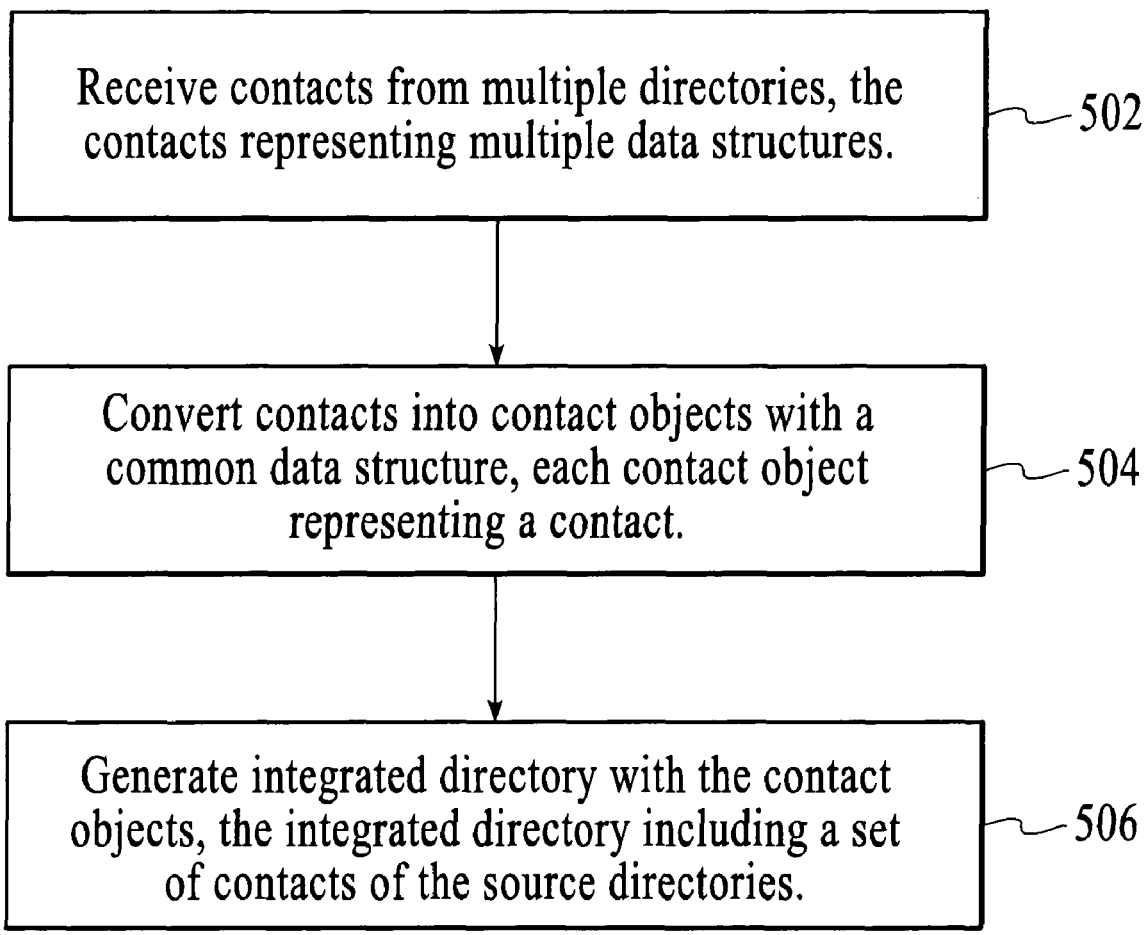
FIG. 5 is a flow diagram for forming a directory comprising contact information from disparate directories, under an embodiment.

As a general example of integration of contacts from disparate directories into a common directory, FIG. 5 is a flow diagram for forming 500 a directory comprising contact information from disparate directories, under an embodiment. The forming 500 includes receiving 502 contacts from multiple directories. The contacts represent or are formed under multiple data structures, with one data structure corresponding to one of the directories. The received contacts are converted 504 into contact objects. The contact objects, each of which represents a contact, all include or are formed under a common data structure. An integrated directory is generated or formed 506 from the contact objects. The integrated directory thus includes a set of contacts of the disparate source directories.

With reference to FIG. 3, the facilitator of an embodiment uses the synchronization protocol (sync) to synchronize the integrated phonebook on the facilitator with the integrated phonebook on one or more clients on which the user logs in to the system. The adapters use different protocols to fetch contacts from applications of the enterprise servers and convert the contacts into contact objects; for example, LDAP is used to fetch contacts from Microsoft Active Directory, Web-based Distributed Authoring and Versioning (WebDAV) is used to fetch contacts from Microsoft Exchange, and SIP/SIMPLE is used to fetch contacts from instant message (IM) buddy lists. The facilitator of an alternative embodiment can include other adapters as appropriate to a configuration of the host enterprise server. An embodiment tracks only contacts in the AMC phonebook but is not so limited. Non-AMC contacts in the third-party directory servers are outside the purview of the AMC system and are therefore referred to as "background" contacts.

New contacts can be added to the entries in the integrated phonebook. The addition of the new contacts includes referencing existing contacts in one or more of the enterprise servers. The addition of contacts can also include adding one or more new personal contacts from the client, where the new contacts from the client are then stored in the personal contacts server as a new personal contact.

In addition to the contacts, presence and availability information is added to the directory for all users in these directories who are also AMC users. Presence and availability information can be referenced from an external presence server and/or generated and maintained internally within the facilitator. Presence and availability information can be transmitted for contacts in both the communications log and the integrated phonebook, because there may be overlap between communication log and integrated phonebook contacts, presence and availability for each contact should be transmitted only once). The facilitator of an alternative embodiment transmits presence and availability information relating only to contacts in the communications log; this significantly reduces the number of presence updates and aids in scalability, without significantly sacrificing user needs for presence and availability updates.

The AMC system communication log and integrated phonebook can be viewed as layers but is not so limited. The rate controller of the facilitator uses the layered phonebook concept to intelligently transfer data between the facilitator and the client. In addition to the integrated phonebook, the communications log comprises contacts of others with whom the user has recently communicated. The contacts of the communications log can overlap with contacts in one or more of the integrated phonebook, the enterprise directories, and background contacts, but may also include contacts that are not in any directory.

The layered directory provides, on phones with limited memory and relatively lower network bandwidth for example, efficient use of available memory and bandwidth through manual selection of a subset of contacts to synchronize from the server to the client devices. Further, regarding presence and availability updates for contacts, the layered directory allows the facilitator to update presence and availability information for a pre-specified contact type (e.g. contacts in the communication log) independent of contact in other directory lists, thereby providing for significantly reduced network traffic between the server and the client and also between servers (e.g., in a cluster). This structured updating of presence and availability updates therefore functions according to a temporal locality principle under which contacts with whom the user has recently communicated are most probably the ones whose availability and presence would be important to the user at any given time.

The communications log configuration can be augmented to include static and dynamic entries. Static entries are manually designated by the user and remain in the communications log even if there has not been communication with that contact for some period of time, while dynamic entries would be added and dropped by the system based on communication patterns. The communication pattern algorithm of an embodiment is based not only on recent communications but also on the history and/or type of communications (e.g., if a contact appears and drops from the communications log sporadically, the system may decide to simply keep the contact in the phonebook for longer durations).

The dynamic integration of multiple disparate directories provided by the AMC system of an embodiment dynamically synchronizes all enterprise directories so as to place or integrate contact information designated by a user from the disparate directories together into a common AMC phonebook. Following formation of the "common" directory of desired contact information from subsets of data from the enterprise directories, the AMC system of an embodiment allows user searching of the common directory. Thus, the AMC system provides for searching of multiple directories with one common input.

The searching provide by the AMC system includes remote searching and local searching. Local searching is performed against the local integrated phonebook on a client device. In contrast, remote searching is performed against one or more directories of the enterprise server (e.g. corporate directory, etc.). The local directory on the client device therefore effectively functions like a cache of information of one or more of the directories of the enterprise server, where the cache is stored locally on the client device, as described below.

The dynamic aggregation and management of contact information from multiple disparate sources provides client device users with access to accurate real-time contact information at their devices without the need for manually loading the information into the native phonebook of the client device. As an example, with reference to FIGS. 1-3, corporate/enterprise directory information is pushed to the facilitator, but the AMC system of alternative embodiments may receive the corporate/enterprise directory information via any number of methods known in the art. Due to limited processing resources on the client devices, however, not all contact data may be stored on the client devices. The AMC system provides convenient search and retrieve features from the client device to facilitate easy lookup of personal or corporate directory information, as described below.

Access to the aggregated contact information by a user of the AMC system is supported by the AMC client via search queries directed at all directory information to which the AMC system has access. The search queries are based on various combinations of name, including last name, first name, and partial name. Alternatively, rather than supplying the first few letters of the name into a field for a name-based search, the user may access an alphabetical display that accesses records corresponding with the first letter of the first or last name. Other search criteria or attributes of a contact or user upon which searching and sorting can be based in an embodiment, include but are not limited to presence, availability, location, email, phone number, network identification, title, profession company, department, location/facility, region, group affiliation (i.e. information assigned by a system administrator such as West Coast Sales Team, Account Team, Escalation Support Team, etc.), mailing list of which contact is a member, supervisor name, assistant, instant messaging address, children, spouse, notes, category, last active date, and other miscellaneous fields or information. This information can assist in the search for the appropriate contact, but completion of the fields is optional for any given search.

Search queries of an embodiment can include information in addition to or as a substitution of a contact name; for example, relational information that links to the contacts can be searched or returned in the search results. The relational data is tied to one or more of the identity, location, and/or other criteria of the contact. The relational data includes static information such as cities or location codes. The relational data also includes dynamic information such as the weather, stock information for the company associated with a contact, most recent order items of the contact, etc.

Upon completion of a search, components of the AMC system coalesces and then forward the results of the search to the user's client device for display, where the AMC system responds with search results that approximate the initial query as best as possible. Along with user name, other relevant details/cues are provided with each record to assist the user in identifying the appropriate contact. Examples of this include, but are not limited to, phone number, department, city/facility, and/or group affiliation. Preferences for this additional information are configured using the portal, described above. When a search results in multiple names fitting the search criteria, then the user has the ability to scroll and select the correct entry using the navigation keys. Additional contextual information, such as presence and available, from additional directories may be combined into the results.

The portal (FIG. 3) of an embodiment includes a browser-based search interface for use by the user when logged in to the portal during configuration and maintenance. The portal also supports easy selection of contacts from both personal phonebooks and corporate phonebooks to make these contacts available via the client device. The portal also allows the user to designate contacts from both personal phonebooks and corporate phonebooks as communications log entries that may appear in a priority order on the phone contact list.

Components of the AMC system support integration with numerous personal contact managers, for example Microsoft Outlook, Lotus Notes, and ACT to name a few. From a client device perspective, an end user has access to personal contact information (e.g., client device phonebook entries, desktop contact list in Outlook, etc.) as well as corporate contact information. The user can manage all of these contact databases as separate phonebooks rather than attempt to integrate them into one database.

The AMC system of an embodiment supports user-initiated information transfers (uploads and downloads) between contact managers and the facilitator. Further, the AMC system of an embodiment supports user-initiated information transfers (uploads and downloads) between the AMC client and the facilitator. The facilitator resolves duplicates and any discrepancies when new contacts are input to the facilitator from either a personal contact manager or the AMC client.

The AMC system of an embodiment further supports user creation, modification, and deletion of AMC subscriber groups (or consolidated contacts) as a permission-based feature via the portal, but is not so limited. Therefore, any user with permission can create groups. An individual creating a group in an embodiment is considered the sole owner of the group and the only person able to modify the group, but the embodiment is not so limited. The group owner as well as a system administrator can delete groups. Groups are viewed using either of the portal or a client device that includes an AMC client. Subscribers can upload group definitions to AMC client devices for use in communications logs and the general contact list, just like ordinary contacts.

Regarding a search algorithm of the AMC system of an embodiment, a user selects a name according to a [last first] format, and the search algorithm simultaneously or subsequently returns any user matching the input substring. The results are sorted in the following manner: names for which a substring of n characters matches exactly the FIRST n characters of the LAST name (the variable n represents a number 1, 2, . . . ); names for which a substring of n characters matches exactly the FIRST n characters of the FIRST name; and, all other substring matches in alphabetical order by last name.

For example, if a user searches for "er", the return order of names resulting from the search is as follows:
Erlanger, Buffy
Ermine, Foxy
Schwartz, Ernestine
Bistro, Bernie
Ferguson, Frumpy
Mercury, Freddy This example search provides one desired return order (Buffy and Foxy first, then Ernestine), and also allows the user two taps to type "mp" to immediately select "Frumpy."

Remote search can be configured to exclude contacts already in the integrated directory from being displayed in the results. Since remote search is typically used when a contact cannot be found in the integrated phonebook, this provides a useful filtering for most users. Further, the search result for one's own contact is also typically filtered out of the result, to again reduce clutter that are of less importance to the user.

The AMC system can choose to limit the number of search results returned to the client device based on user preference, AMC system settings and parameters, and/or based on characteristics of the enterprise directories being searched. When searching enterprise directories that limit search results or do not provide sorting controls that satisfy the sorting requirements of an embodiment, the AMC system can issue multiple related queries against the directory in order to return the most relevant set of limited results. In the embodiment described above, where results are sorted first by names that start with a particular substring, followed by names that include the substring, when searching a particular enterprise directory that limits results and does not provide for sorting control, the AMC can determine that a single search does not provide the most relevant set of limited results. For example, if a user searches for "e" in last name, and an enterprise directory returns at most five (5) results and sorts alphabetically, the returned names may be as follows:
Almaden, Frank
Alberts, Christine
Budke, Phil
Erlanger, Buffy
Ermine, Foxy The AMC system of an embodiment can determine that there are additional results that start with "e" and should be returned before some of the other results in the above list. In this example the AMC system can then issue a second query for only those names that start with "e" and properly combine and sort the results from both queries before aggregating, sorting, and limiting the results from all directories searched.

Using a search algorithm of the AMC system of another embodiment, a user selects a name a name according to a [first last] format, and the search algorithm simultaneously or subsequently returns any user matching the input substring. The results are sorted in the following manner: names for which a substring of n characters matches exactly the FIRST n characters of the FIRST name; names for which a substring of n characters matches exactly the FIRST n characters of the LAST name; and, all other substring matches in alphabetical order by first name.

For example, if a user searches for "er", the return order of names resulting from the search is as follows:
Ernestine Schwartz
Buffy Erlanger
Foxy Ermine
Bernie Bistro
Freddy Mercury
Frumpy Ferguson The search algorithms described above can be implemented both in the local search on the client device, remote search via the client device, and portal searches. However, there is a slight difference between the local search and the server searches (remote and portal) in that the server searches provide separate search criteria for first name and last name. Given the difference between local and server search criteria, the following adjustments are made to the search algorithm described above for server searches.

For server searches, using the first example described above (e.g., search a name according to a [last first] format), if a user searches for "er" in the last name, the return order of names resulting from the search is as follows:
Erlanger, Buffy
Ermine, Foxy
Ferguson, Frumpy
Mercury, Freddy Using the second example described above (e.g., search a name according to a [first last] format), if a user searches for "er" in the first name, the return order of names resulting from the search is as follows:
Schwartz, Ernestine
Bistro, Bernie If a user enters a query that searches for "er" in both names, no names are returned as none of the names have "er" in both the first and last name. Further, when a user searches for "e" in both names, the return would be "Mercury, Freddy."

Figure 6:
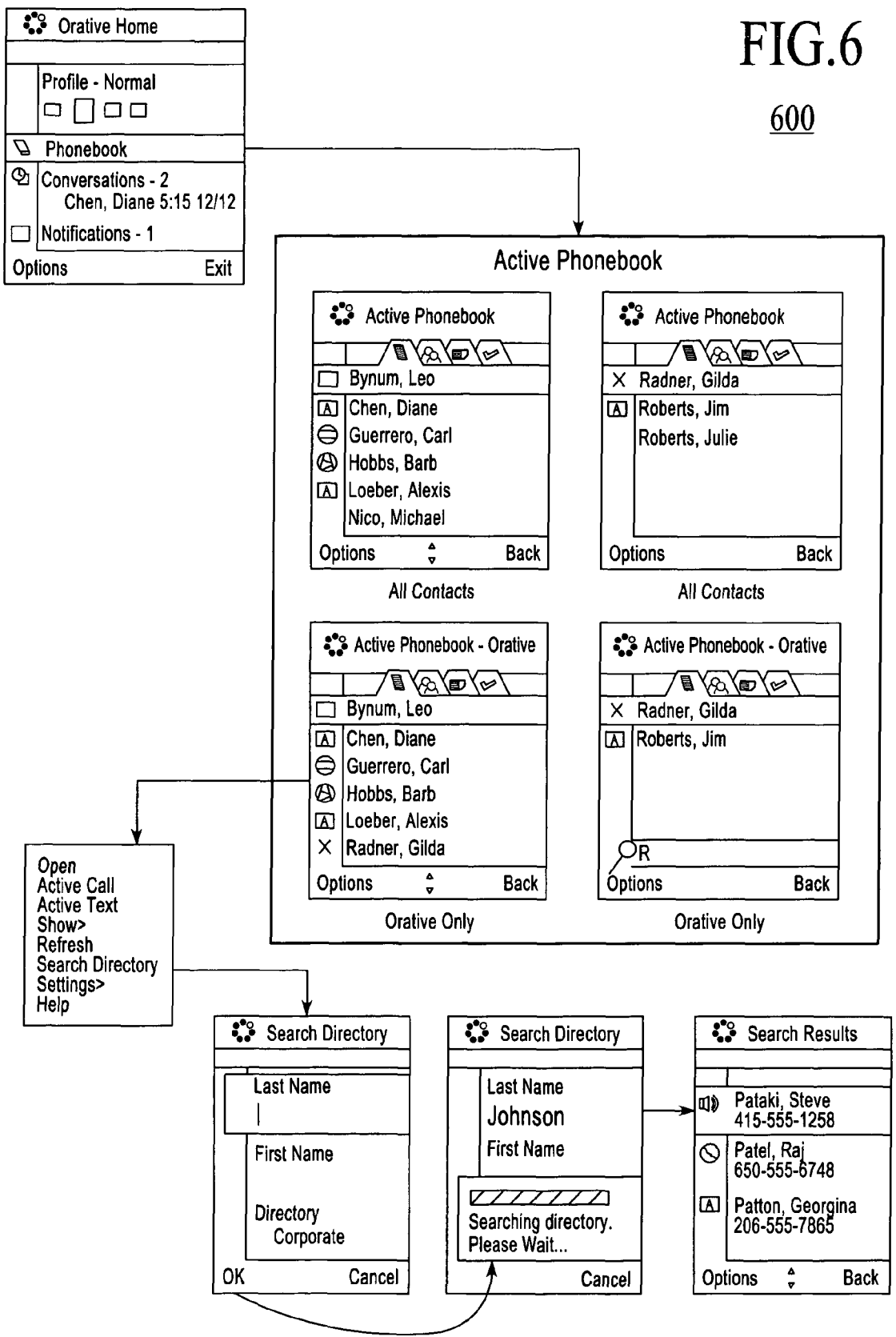
FIG. 6 is a directory search flow for a search of the integrated phonebook of the AMC system.

As described above, an embodiment allows a user to search any directories of the AMC system and any directories of the enterprise servers via his/her client device. FIG. 6 is a directory search flow 600 for a search of the integrated phonebook of the AMC system. The search flow 600 includes selection of the integrated phonebook on the client device, from which a user selects the option of searching the directory. The user then enters search criteria when prompted via the UI of the client device, and the AMC client causes the search results to be presented or displayed to the user via the UI.

The AMC system also allows a user to search directories of the enterprise servers via his/her client device. The UI provides input fields, upon selection of an enterprise directory search option, also referred to as an extended search, by which a user enters corporate directory search criteria that is submitted or transferred to the facilitator. The search criterion is a text string that is matched against the contact name field in the contact directories, but is not so limited. The results of the search are returned to the user and presented via the device UI. The result presentation on the UI provides options for initiating an AMC system calling feature, adding a contact to a phonebook of the client device, and/or launching an extended search against the enterprise directories. The extended search causes the facilitator to apply the search criteria against the enterprise directories to which the user/facilitator has access.

FIG. 7 is a directory Search View tree 700 of the AMC system, under an embodiment. A directory Search Criteria screen G1 provides input fields to enter contact directory search criteria that will be submitted to the facilitator. In one embodiment, the search feature is a two step process; this screen initiates a search against information resident in the client device and the facilitator directories. The results of this search are immediately returned to the user. If the user did not find the contact they were looking for, they can initiate an extended search which instructs the facilitator to search the various contact directories to which it is connected or has access in the enterprise. In one embodiment, the search criteria include a text string that is matched against the contact name field in the contact directories. Various text entry modes are supported. The search results are returned to the user via the handset user interface.

A search results Options menu G3 provides options the user can initiate against one or more contacts from the local Search Results screen G2. In one embodiment, the following menu item preconditions are enforced: (i) Menu item number 1 (Active call), requires the user to select one or more contacts (or groups) first; (ii) Menu item number 2 (Watch Availability), requires the user to select one or more user contacts (or groups) first; and (iii) Menu item number 3 (Add new), requires the user to select one and only one contact first.

An Extended Search Confirmation screen G4 provides a dialog that asks for user confirmation before initiating an extended directory search. The search criteria were previously entered on the Directory Search Criteria screen. Since it may take a short while to complete the extended search, the results are returned to the use via an AMC alert and appear in the user's inbox. An Extended Search Results screen G5 illustrates a case in which multiple matching entries were found.

Figure 8:
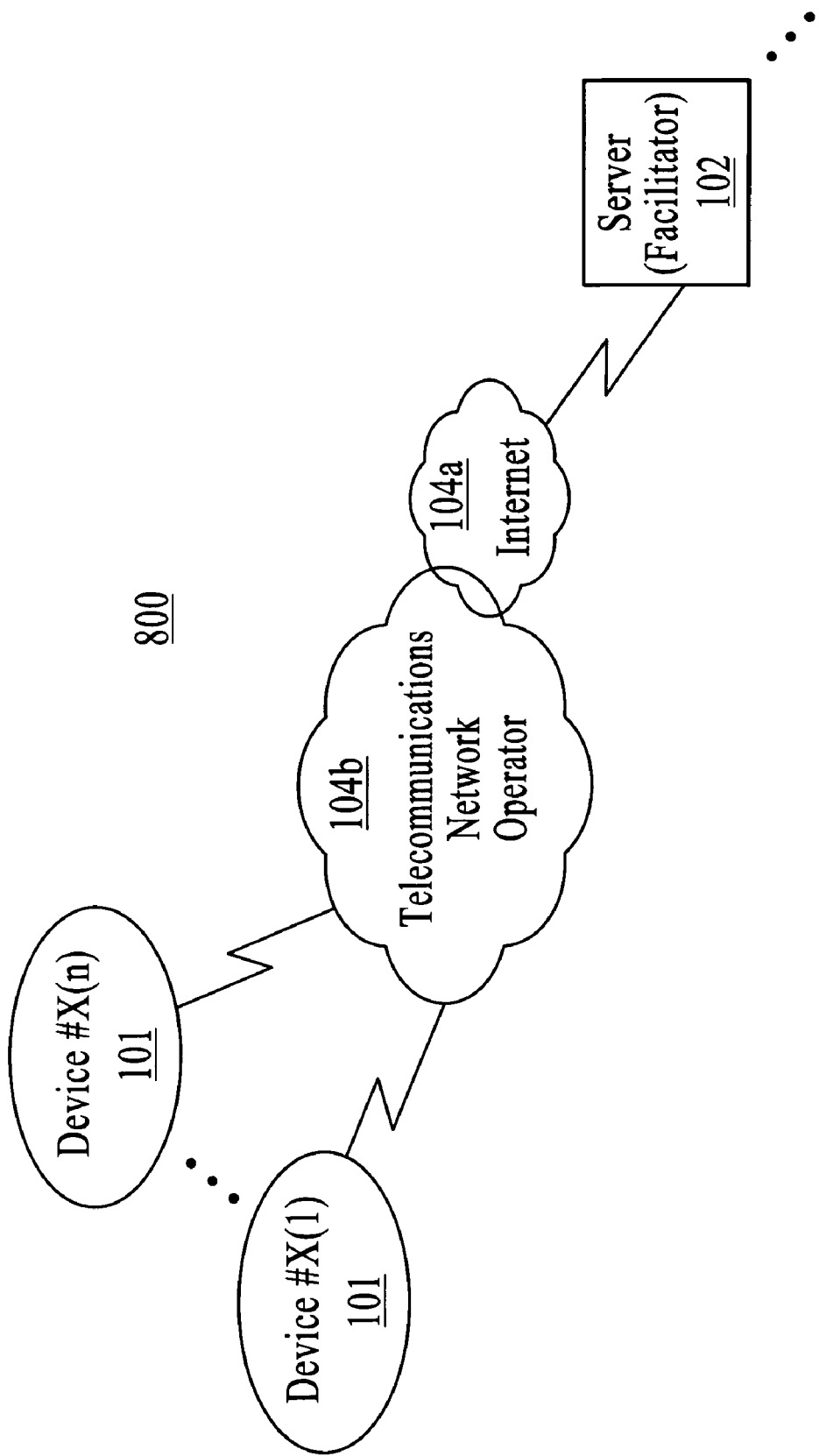
FIG. 8 is a block diagram of an AMC system, under an alternative embodiment.

Some examples follow of alternative AMC system configurations that include the facilitator and client described above. FIG. 8 is a block diagram of an AMC system 800, under an alternative embodiment. The AMC system 800 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 9:
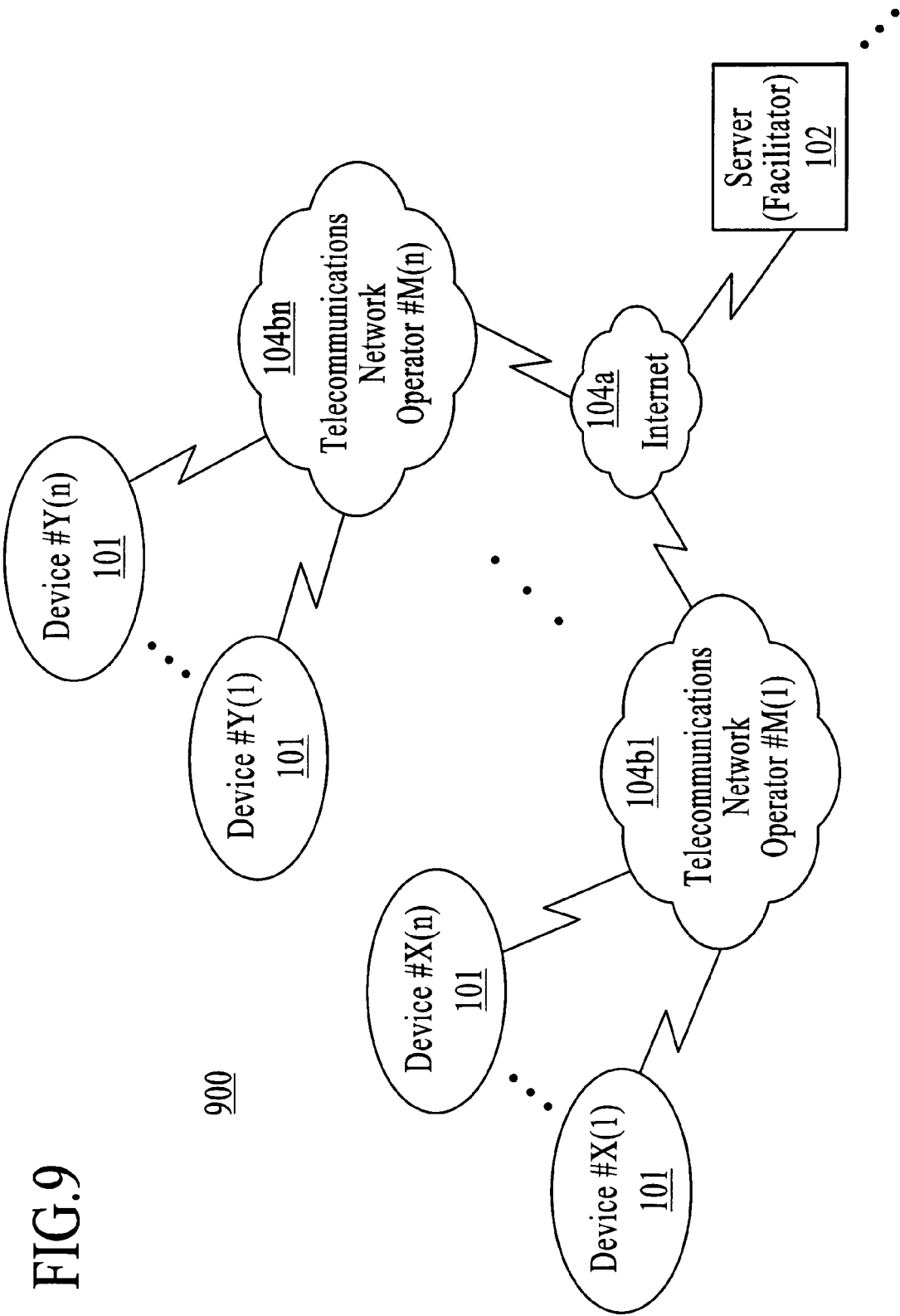
FIG. 9 is a block diagram of an AMC system, under another alternative embodiment.

FIG. 9 is a block diagram of an AMC system 900, under another alternative embodiment. The AMC system 900 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 8, but are not so limited.

Figure 10:
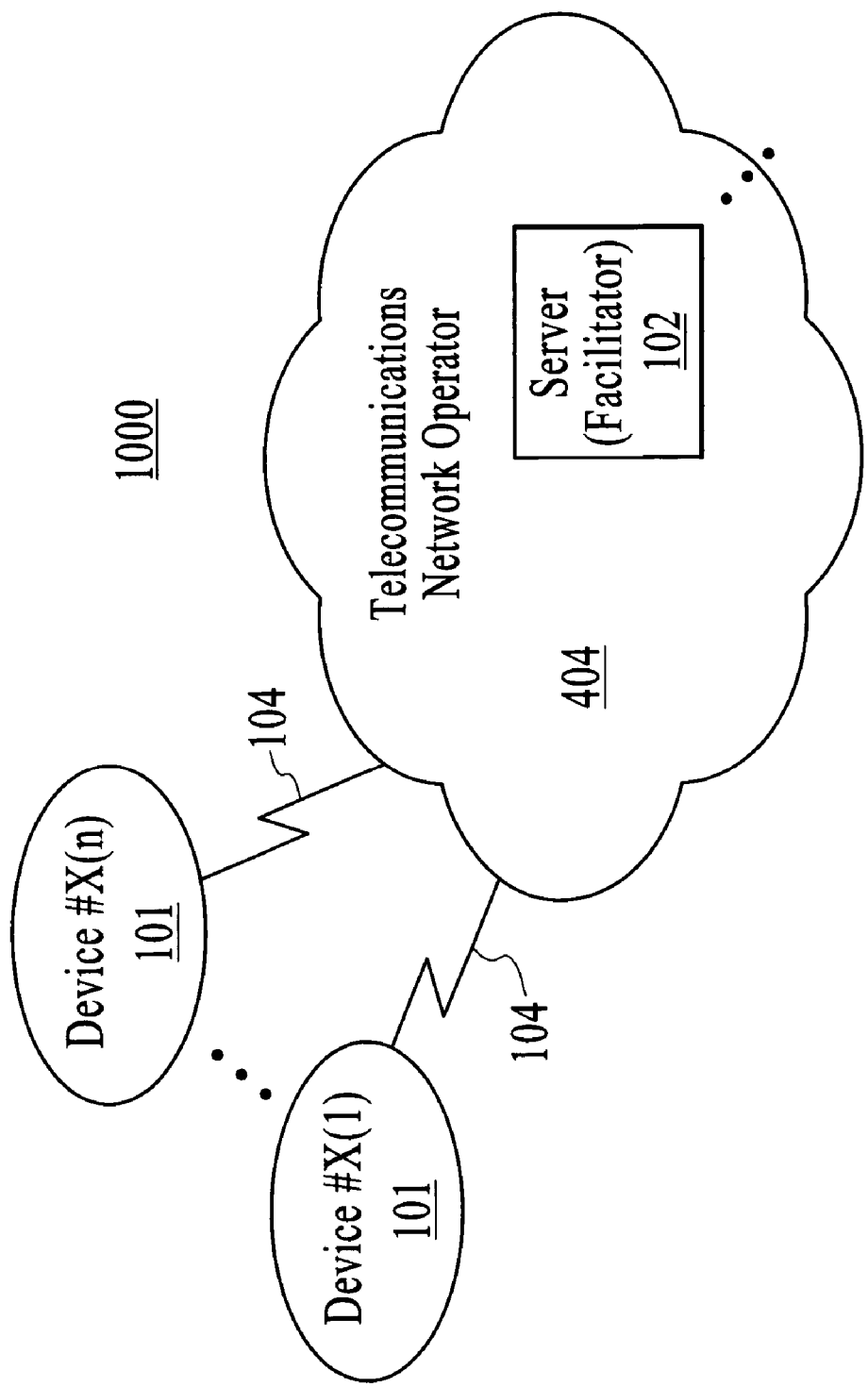
FIG. 10 is a block diagram of an AMC system, under yet another alternative embodiment.

FIG. 10 is a block diagram of an AMC system 1000, under yet another alternative embodiment. The AMC system 1000 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 11:
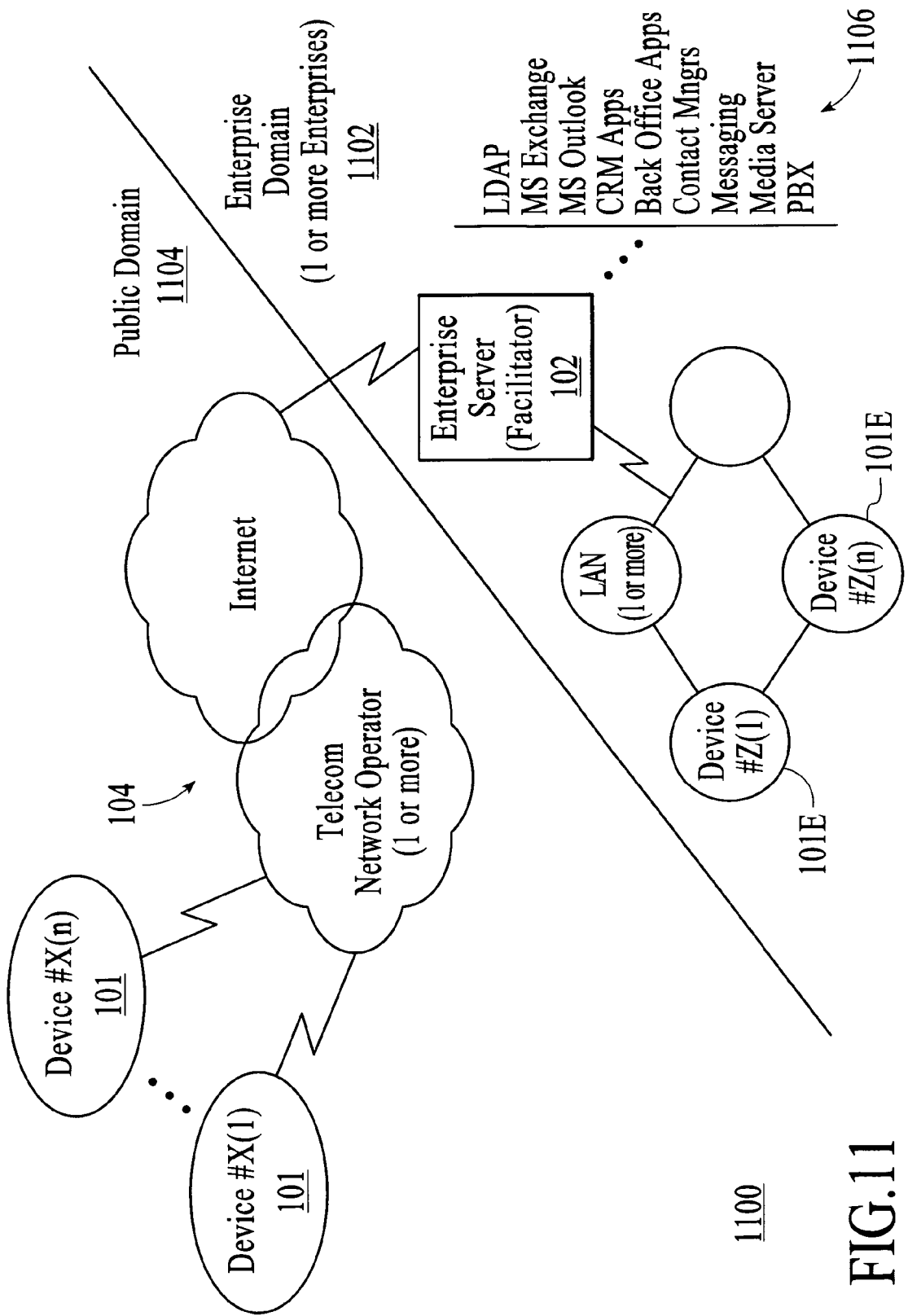
FIG. 11 is a block diagram of an AMC system in an enterprise domain, under another alternative embodiment.

FIG. 11 is a block diagram of an AMC system 1100 in an enterprise domain, under another alternative embodiment. The AMC system 1100 includes a server hosting the facilitator 102 where the server/facilitator 102 is a component of a corporate or enterprise infrastructure 1102. The server can host numerous additional applications 1106 in addition to the facilitator 102 or can be dedicated to the facilitator 102. The facilitator 102 communicates with one or more client devices 101 in the public domain 1104 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1102 to provide AMC system functions among the client devices 101E as described below. The client devices 101E in the enterprise domain 1102 are shown coupled to one or more LANs, but are not so limited.

Figure 12:
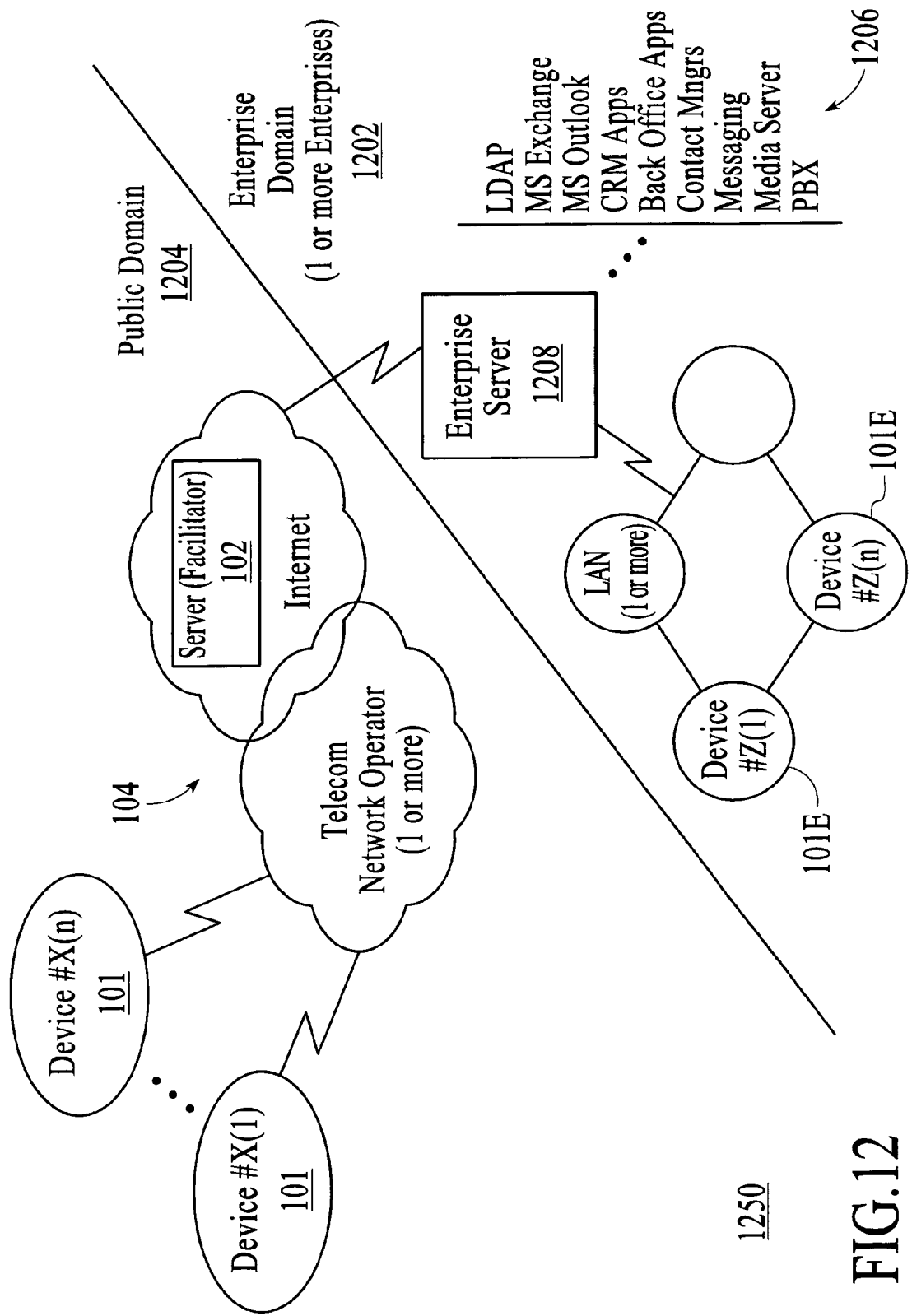
FIG. 12 is a block diagram of an AMC system in a public domain coupled across components of an enterprise domain, under another alternative embodiment.

FIG. 12 is a block diagram of an AMC system 1250 in a public domain coupled across components of an enterprise domain, under another alternative embodiment. The AMC system 1250 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1204 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1202 including, for example, one or more client devices 101E, one or more enterprise servers 1208, and one or more LANs. The facilitator 102 provides AMC system functions among the client devices 101E as described below. The client devices 101E in the enterprise domain 1202 are shown coupled to one or more LANs, but are not so limited.

As an alternative to the couplings of this AMC system 1200, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 13:
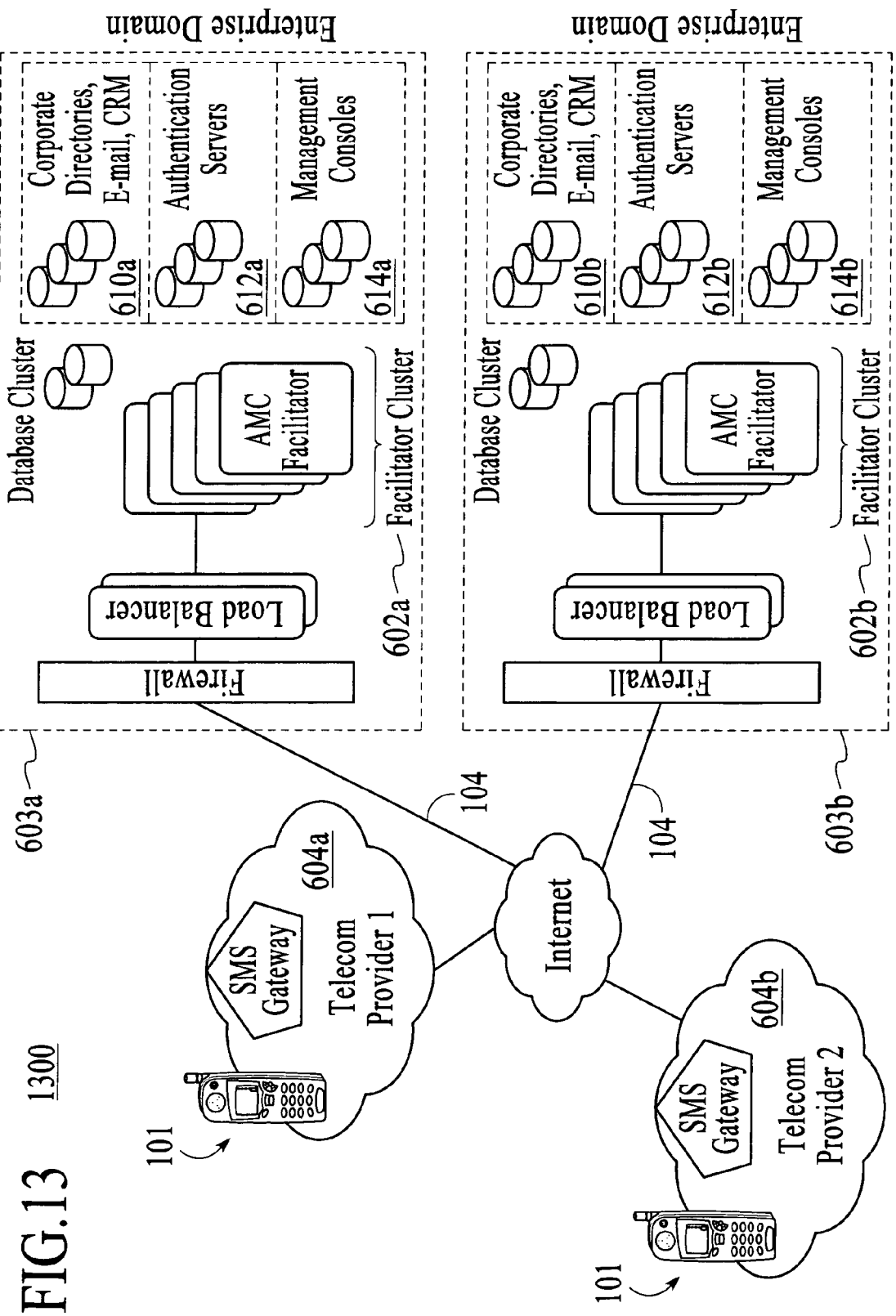
FIG. 13 is a block diagram of an AMC system in an enterprise domain, under still another alternative embodiment.

FIG. 13 is a block diagram of an AMC system 1300 in an enterprise domain, under still another alternative embodiment. The AMC system 1300 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 14:
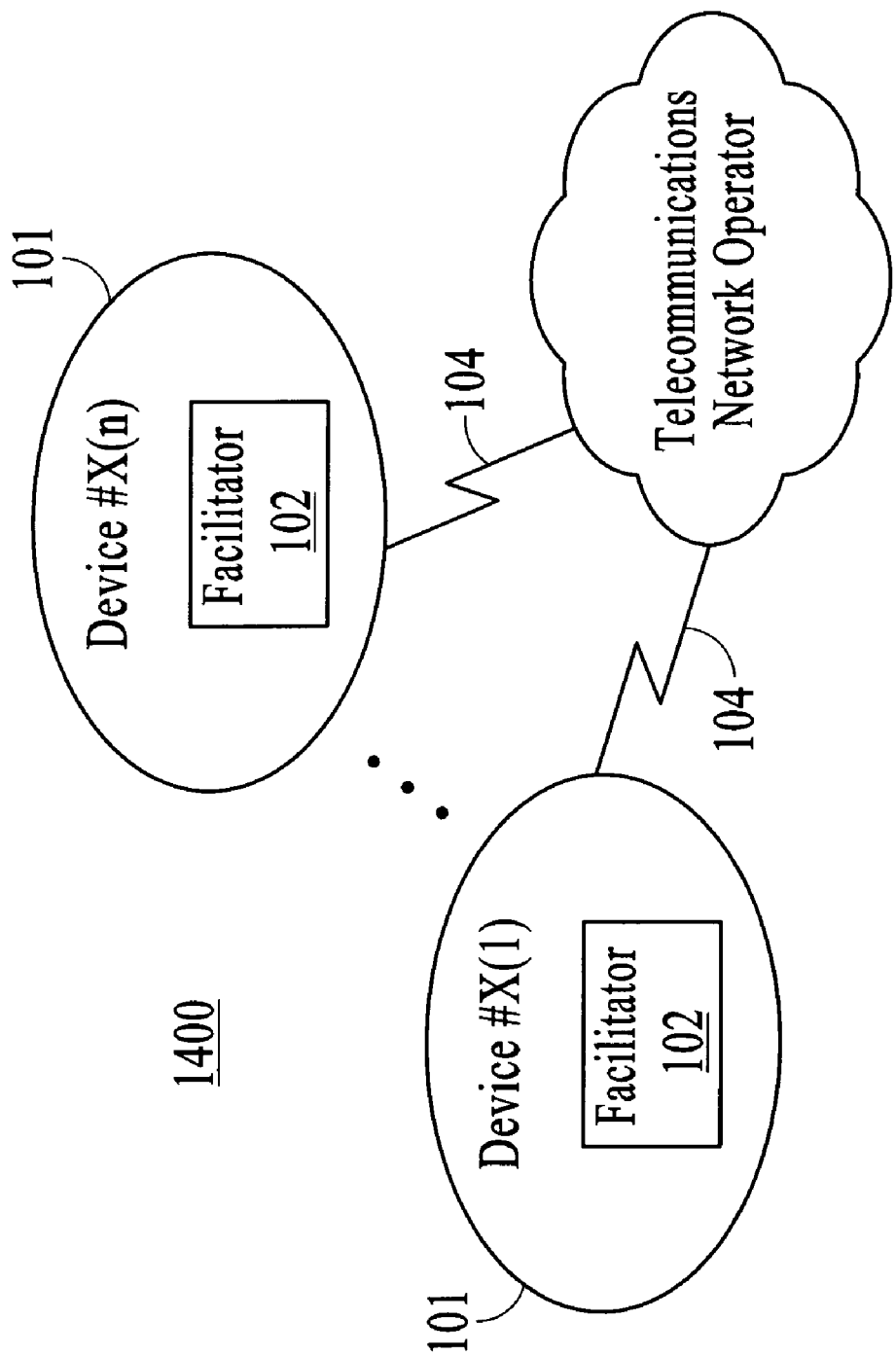
FIG. 14 is a block diagram of an active mobile collaboration (AMC) system, under an embodiment.

FIG. 14 is a block diagram of an active mobile collaboration (AMC) system 1400, under an embodiment. The AMC system 1400 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communications systems described herein include a method comprising, receiving a search query, performing a search of contacts of a plurality of directories using the search query, the search including a remote search of a plurality of remote directories that represent contacts under a plurality of data structures, and providing a result of the search.

In an embodiment of a method, performing the remote search comprises accessing at least one enterprise hosting the plurality of remote directories.

In an embodiment of a method, performing the remote search comprises accessing a plurality of enterprises, wherein each enterprise of the plurality of enterprises hosts at least one of the plurality of directories.

In an embodiment of a method, performing the remote search comprises accessing one or more of public directories and private directories hosting the plurality of remote directories.

In an embodiment of a method, receiving comprises receiving the search query as an input at a client device.

In an embodiment of a method, the plurality of remote directories is located remote to the client device.

In an embodiment of a method, receiving at a client device includes receiving at one or more of a mobile communication device and a personal computer.

In an embodiment, the method further comprises transferring the result of the search to the client device.

In an embodiment, the method further comprises displaying the result of the search on the client device.

In an embodiment, the plurality of remote directories include one or more of enterprise directories, public directories, private directories, and personal directories.

In an embodiment of a method, the plurality of remote directories includes a plurality of remote directories hosted on one or more enterprise servers.

In an embodiment of a method, the search query includes information of one or more of a name, address, department, city, facility, and group.

In an embodiment of a method, performing the search includes performing the search comprising a local search of an integrated directory that includes a set of contacts coalesced from the plurality of remote directories to form the set of contacts under a common data structure.

In an embodiment of a method, the integrated directory is synchronized to the client device.

In an embodiment of a method, the result of the remote search excludes contacts included in the integrated directory.

In an embodiment of a method, performing the local search comprises accessing one or more of a client device and a portal hosting the integrated directory.

In an embodiment of a method, performing the local search comprises searching an active integrated directory, the active integrated directory including active contacts of the set of contacts that correspond to other users with whom an owner of the integrated directory has communicated during a pre-specified period of time.

In an embodiment of a method, the active contacts include one or more contacts of the integrated directory.

In an embodiment of a method, the active contacts include one or more contacts of the plurality of directories that are missing from the integrated directory.

In an embodiment of a method, the active contacts include one or more contacts missing from the plurality of directories and from the integrated directory.

In an embodiment of a method, the active contacts include one or more background contacts, the background contacts including contacts that correspond to other users with whom an owner of the integrated directory has communicated outside the pre-specified period of time.

In an embodiment of a method, performing the local search comprises searching a background directory, the background directory including background contacts that correspond to other users with whom an owner of the integrated directory has communicated outside the pre-specified period of time.

In an embodiment, the method further comprises, for at least one directory of the plurality of directories, mapping the search query to another search query that can be processed by the at least one directory.

In an embodiment, the method further comprises, for at least one directory of the plurality of directories, mapping the result to a common result format and aggregating the results having the common result format.

In an embodiment, the method further comprises selecting the result to add to an integrated directory, wherein the integrated directory includes a set of contacts coalesced from the plurality of remote directories to form the set of contacts under a common data structure.

In an embodiment, the method further comprises comprising synchronizing the integrated directory between a remote server and a client device of a user initiating the search.

In an embodiment, the method further comprises the remote server receiving revisions to contacts of the set of contacts, updating the integrated directory to form a revised integrated directory in response to the updates, and synchronizing the revised integrated directory with the client device.

In an embodiment, the method further comprises receiving revisions to contacts of the set of contacts via the client device, synchronizing the revisions with one or more of the plurality of directories.

In an embodiment of a method, the result of the remote search excludes a contact of the user initiating the search.

In an embodiment of a method, the search comprises using a plurality of search queries to provide a complete version of the result when a server hosting the plurality of remote directories limits the result.

In an embodiment, the method further comprises receiving presence and availability information and integrating the presence and availability information into the set of contacts.

The communications systems described herein include a system comprising, a server, wherein the server is coupled to an enterprise and a communication network that includes a client device, and a search component coupled to the server, wherein the search component is configured to receive a search query and in response to perform a search, the search including a remote search of a plurality of remote directories of the enterprise that represent contacts under a plurality of data structures, wherein at least one of the server and the client device include the integrated directory.

In an embodiment of a system, the search component is configured to perform the remote search by accessing at least one enterprise hosting the plurality of remote directories and accessing one or more of public directories, private directories, and personal directories hosting the plurality of remote directories.

In an embodiment of a system, receiving comprises receiving the search query as an input at the client device, wherein the plurality of remote directories is located remote to the client device.

In an embodiment of a system, the search component is configured to transfer the result of the search to the client device.

In an embodiment of a system, the search query includes information of one or more of a name, address, department, city, facility, and group.

In an embodiment of a system, the search comprises a local search of an integrated directory that includes a set of contacts coalesced from the plurality of remote directories to form the set of contacts under a common data structure In an embodiment of a system, the integrated directory is synchronized to the client device.

In an embodiment of a system, the search component is configured to perform the local search by accessing one or more of a client device and a portal hosting the integrated directory.

In an embodiment of a system, the search component is configured to perform the local search by searching an active integrated directory, the active integrated directory including active contacts of the set of contacts that correspond to other users with whom an owner of the integrated directory has communicated during a pre-specified period of time.

In an embodiment of a system, the search component is configured to, for at least one directory of the plurality of directories, map the search query to another search query that can be processed by the at least one directory.

In an embodiment of a system, the search component is configured to, for at least one directory of the plurality of directories, map the result to a common result format and aggregating the results having the common result format.

In an embodiment of a system, the server is configured to add the result to an integrated directory, wherein the integrated directory includes a set of contacts coalesced from the plurality of remote directories to form the set of contacts under a common data structure.

In an embodiment, the system further comprises synchronizing the integrated directory between the server and the client device of a user initiating the search.

In an embodiment of a system, the server is configured to receive revisions to contacts of the set of contacts, update the integrated directory to form a revised integrated directory in response to the updates, and synchronize the revised integrated directory with the client device.

In an embodiment of a system, one or more of the server and the client device are configured to receive revisions to contacts of the set of contacts via the client device, and synchronize the revisions with one or more of the plurality of directories.

In an embodiment of a system, one or more of the server and the client device are configured to receive presence and availability information and integrate the presence and availability information into the set of contacts.

The communications systems described herein include a computer readable media including executable instructions which, when executed in a processing system, searches multiple directories by, receiving a search query, performing a search of contacts of a plurality of directories using the search query, the search including a remote search of a plurality of remote directories that represent contacts under a plurality of data structures, and providing a result of the search.

The communications systems described herein include a method comprising receiving a plurality of contacts from a plurality of directories. The contacts of an embodiment represent a plurality of data structures. The method of an embodiment includes converting the plurality of contacts into a plurality of contact objects that have a common data structure and each represent one of the contacts. The method of an embodiment includes generating an integrated directory to include the plurality of contacts by coalescing the plurality of contact objects. The integrated directory of an embodiment includes contacts representing a set of contacts of the plurality of directories.

In a method described herein, receiving the plurality of contacts from a plurality of directories includes receiving from a plurality of directories hosted on one or more first servers.

In an embodiment, receiving from the plurality of directories hosted on one or more first servers comprises receiving using a protocol specific to each directory.

In an embodiment, receiving from the plurality of directories hosted on one or more first servers comprises authenticating with each directory using authentication information mapped to the directory.

In an embodiment, the first servers include one or more enterprise servers and directory servers.

In an embodiment, the first servers include one or more enterprise servers and directory servers, wherein receiving includes receiving at one or more second servers.

In an embodiment, the method further comprises receiving information designating the plurality of contacts in the plurality of directories.

In an embodiment, the method further comprises transferring the integrated directory to a client device.

In an embodiment, the method further comprises adding a new contact to the integrated directory by receiving information of the new contact at the client device.

In an embodiment, the method further comprises adding a new contact to the integrated directory by designating additional contacts of the plurality of directories.

In an embodiment, generating includes generating the integrated directory at a collaboration server that is different from one or more servers hosting the plurality of directories.

In an embodiment, the method further comprises transferring the integrated directory to a client device.

In an embodiment, the method further comprises periodically synchronizing the integrated directory of the collaboration server with the integrated directory of the client device.

In an embodiment, the method further comprises periodically synchronizing the integrated directory of the collaboration server with the plurality of directories.

In an embodiment, the method further comprises including one or more of presence and availability information in the integrated directory, wherein the presence and availability information corresponds to one or more respective contacts of the integrated directory.

In an embodiment, the method further comprises generating an active integrated directory, the active integrated directory including active contacts that correspond to other users with whom an owner of the integrated directory has communicated during a pre-specified period of time.

In an embodiment, the active contacts include one or more contacts of the integrated directory.

In an embodiment, the active contacts include one or more contacts of the plurality of directories that are missing from the integrated directory.

In an embodiment, the active contacts include one or more contacts missing the plurality of directories and from the integrated directory.

In an embodiment, the active contacts include one or more background contacts, the background contacts including contacts that correspond to other users with whom an owner of the integrated directory has communicated outside the pre-specified period of time.

In an embodiment, generating includes generating the active integrated directory at a collaboration server that is different from one or more servers hosting the plurality of directories.

In an embodiment, the method further comprises transferring the active integrated directory to a client device.

In an embodiment, the method further comprises periodically synchronizing the active integrated directory of the collaboration server with the active integrated directory of the client device.

In an embodiment, the method further comprises designating one or more active contacts of the active integrated directory as a static contact, wherein the static contact remains in the active integrated directory when a last communication event including the static contact is outside the pre-specified period of time.

In an embodiment, the method further comprises one or more of adding a contact to and removing a contact from the active integrated directory according to a communication pattern of the contact.

In an embodiment, the method further comprises generating a background directory, the background directory including background contacts that correspond to other users with whom an owner of the integrated directory has communicated outside the pre-specified period of time.

In an embodiment, generating includes generating the background directory at a collaboration server that is different from one or more servers hosting the plurality of directories.

In an embodiment, the method further comprises transferring the background directory to a client device.

In an embodiment, the method further comprises periodically synchronizing the background directory of the collaboration server with the background directory of the client device.

In an embodiment, the method further comprises moving one or more of an active contact from the active integrated directory to the background directory and one or more of a background contact from the background directory to the active integrated directory.

The communications systems described herein also include a system comprising a server coupled to at least one communication network, and a plurality of adapters coupled to the server and to a plurality of directories that include a plurality of contacts having a plurality of data structures, wherein each of the plurality of adapters includes a protocol for receiving a set of contacts that includes a data structure of the plurality of data structures, wherein at least one of the adapters and the server are configured to convert the set of contacts from each adapter into a set of contact objects having a common data structure and generate an integrated directory by coalescing the set of contact objects from each adapter, wherein the integrated directory includes contacts representing a subset of contacts of the plurality of directories.

In an embodiment of a system, receiving the plurality of contacts from a plurality of directories includes receiving from a plurality of directories hosted on one or more first servers using a protocol specific to each directory.

In an embodiment of a system, receiving from the plurality of directories hosted on one or more first servers comprises authenticating with each directory using authentication information mapped to the directory.

In an embodiment of a system, the first servers include one or more enterprise servers and directory servers.

In an embodiment of a system, one or more of the server and the plurality of adapters are configured to receive information designating the plurality of contacts in the plurality of directories.

In an embodiment of a system, one or more of the server and the plurality of adapters are configured to add a new contact to the integrated directory by designating additional contacts of the plurality of directories.

In an embodiment of a system, generating includes generating the integrated directory at a collaboration server that is different from one or more servers hosting the plurality of directories.

In an embodiment of a system, the server is configured to transfer the integrated directory to a client device.

In an embodiment of a system, one or more of the server and the client device are configured to periodically synchronize the integrated directory of the collaboration server with the integrated directory of the client device.

In an embodiment of a system, the server is configured to periodically synchronize the integrated directory of the collaboration server with the plurality of directories.

In an embodiment of a system, one or more of the server and the plurality of adapters are configured to include one or more of presence and availability information in the integrated directory, wherein the presence and availability information corresponds to one or more respective contacts of the integrated directory.

The communications systems described herein also include a system comprising a server coupled to at least one communication network, and a plurality of adapters coupled to the server and to a plurality of directories that include a plurality of contacts having a plurality of data structures, wherein each of the plurality of adapters includes a protocol for receiving a set of contacts from one of the plurality of directories, wherein the set of contacts includes a data structure of the plurality of data structures, wherein at least one of the adapters and the server are configured to convert the set of contacts from each adapter into a set of contact objects that have a common data structure and generate an integrated directory that includes the set of contacts from each of the plurality of adapters by coalescing the set of contact objects, wherein the integrated directory includes contacts representing a subset of contacts of the plurality of directories.

The communications systems described herein also include a computer readable media including executable instructions which, when executed in a processing system, generates an integrated directory by receiving a plurality of contacts from a plurality of directories, wherein the plurality of contacts represent a plurality of data structures, converting the plurality of contacts into a plurality of contact objects that have a common data structure and each represent one of the contacts. and generating an integrated directory to include the plurality of contacts by coalescing the plurality of contact objects, wherein the integrated directory includes contacts representing a set of contacts of the plurality of directories.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems is not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
   receiving a first search query;
   performing a first search of contacts of a plurality of directories using the first search query, the first search including a remote search of a first remote directory that represents contacts under a first data structure;
   mapping the first search query to a second search query that can be processed by a second directory that represents contacts under a second data structure different than the first data structure;
   performing a second search of the second directory using the second search query;
   converting results of the first and second searches into a plurality of contact objects having a common data structure;
   generating an integrated contact directory comprising the plurality of contact objects;
   displaying the integrated contact directory;
   following the generating the integrated contact directory, receiving a third search query from an associated user;
   receiving search instruction data associated with the third search query from the associated user;
   directing the third search against a one of the second directory or the integrated contact directory selected in accordance with the search instructions data;
   performing the third search on the selected directory; and,
   displaying results of the third search to the associated user.

2. The method of claim 1, wherein performing the remote search comprises accessing at least one enterprise hosting the plurality of remote directories.

3. The method of claim 1, wherein performing the remote search comprises accessing a plurality of enterprises, wherein each enterprise of the plurality of enterprises hosts at least one of the plurality of directories.

4. The method of claim 1, wherein performing the remote search comprises accessing one or more of public directories and private directories hosting the plurality of remote directories.

5. The method of claim 1, wherein receiving comprises receiving the first search query as an input at a client device.

6. The method of claim 5, wherein the plurality of remote directories is located remote to the client device.

7. The method of claim 5, wherein receiving at a client device includes receiving at one or more of a mobile communication device and a personal computer.

8. The method of claim 5, further comprising transferring the result of the search to the client device.

9. The method of claim 5, further comprising displaying the result of the search on the client device.

10. The method of claim 1, wherein the plurality of remote directories include one or more of enterprise directories, public directories, private directories, and personal directories.

11. The method of claim 1, wherein the plurality of remote directories includes a plurality of remote directories hosted on one or more enterprise servers.

12. The method of claim 1, wherein the search query includes information of one or more of a name, address, department, city, facility, and group.

13. The method of claim 1, wherein performing the remote search includes performing the remote search comprising a local search of an integrated directory that includes a set of contacts coalesced from the plurality of remote directories to form the set of contacts under a common data structure.

14. The method of claim 13, wherein the integrated directory is synchronized to the client device.

15. The method of claim 13, wherein the result of the remote search excludes contacts included in the integrated directory.

16. The method of claim 14, wherein performing the local search comprises accessing one or more of a client device and a portal hosting the integrated directory.

17. The method of claim 14, wherein performing the local search comprises searching an active integrated directory, the active integrated directory including active contacts of the set of contacts that correspond to other users with whom an owner of the integrated directory has communicated during a pre-specified period of time.

18. The method of claim 17, wherein the active contacts include one or more contacts of the integrated directory.

19. The method of claim 17, wherein the active contacts include one or more contacts of the plurality of directories that are missing from the integrated directory.

20. The method of claim 17, wherein the active contacts include one or more contacts missing from the plurality of directories and from the integrated directory.

21. The method of claim 17, wherein the active contacts include one or more background contacts, the background contacts including contacts that correspond to other users with whom an owner of the integrated directory has communicated outside the pre-specified period of time.

22. The method of claim 17, wherein performing the local search comprises searching a background directory, the background directory including background contacts that correspond to other users with whom an owner of the integrated directory has communicated outside the pre-specified period of time.

23. The method of claim 1, comprising, for at least one directory of the plurality of directories, mapping the result to a common result format and aggregating the results having the common result format.

24. The method of claim 1, comprising selecting the result to add to an integrated directory, wherein the integrated directory includes a set of contacts coalesced from the plurality of remote directories to form the set of contacts under a common data structure.

25. The method of claim 24, comprising synchronizing the integrated directory between a remote server and a client device of a user initiating the search.

26. The method of claim 25, comprising the remote server receiving revisions to contacts of the set of contacts, updating the integrated directory to form a revised integrated directory in response to the updates, and synchronizing the revised integrated directory with the client device.

27. The method of claim 25, comprising receiving revisions to contacts of the set of contacts via the client device, synchronizing the revisions with one or more of the plurality of directories.

28. The method of claim 1, wherein the result of the remote search excludes a contact of the user initiating the search.

29. The method of claim 1, wherein the search comprises using a plurality of search queries to provide a complete version of the result when a server hosting the plurality of remote directories limits the result.

30. The method of claim 1, comprising receiving presence and availability information and integrating the presence and availability information into the set of contacts.

31. A system comprising:
a server, wherein the server is coupled to an enterprise and a communication network that includes a client device; and
a search component coupled to the server, wherein the search component is configured to receive a first search query and to perform a first search in response to the first search query, the first search including a remote search of a first remote directory of the enterprise that represents contacts under a first data structure;
wherein the search component is configured to map the first search query to a second search query that can be processed by a second directory that represents contacts under a second data structure different than the first data structure;
wherein the search component is configured to perform a second search of a second directory using the second search query; wherein the search component is configured to convert results of the first and second searches into a plurality of contact objects having a common data structure;
wherein the search component is configured to generate an integrated contact directory comprising the plurality of contact objects;
wherein the search component is configured to display the integrated contact directory;
wherein the search component is configured to, flowing the generating the integrated contact directory, receive a third search query from an associated user;
wherein the search component is configured to receive search instruction data associated with the third search query from the associated user;
wherein the search component is configured to direct the third search against a one of the second directory or the integrated contact directory selected in accordance with the search instruction data;
wherein the search component is configured to perform the third search on the selected directory; and,
wherein the search component is configured to display results of the third search to the associated user.

32. The system of claim 31, wherein the search component is configured to perform the remote search by accessing at least one enterprise hosting the plurality of remote directories and accessing one or more of public directories, private directories, and personal directories hosting the plurality of remote directories.

33. The system of claim 31, wherein receiving comprises receiving the search query as an input at the client device, wherein the plurality of remote directories is located remote to the client device.

34. The system of claim 31, wherein the search component is configured to transfer the result of the search to the client device.

35. The system of claim 31, wherein the search query includes information of one or more of a name, address, department, city, facility, and group.

36. The system of claim 31, wherein the search comprises a local search of an integrated directory that includes a set of contacts coalesced from the plurality of remote directories to form the set of contacts under a common data structure.

37. The system of claim 36, wherein the integrated directory is synchronized to the client device.

38. The system of claim 37, wherein the search component is configured to perform the local search by accessing one or more of a client device and a portal hosting the integrated directory.

39. The system of claim 37, wherein the search component is configured to perform the local search by searching an active integrated directory, the active integrated directory including active contacts of the set of contacts that correspond to other users with whom an owner of the integrated directory has communicated during a pre-specified period of time.

40. The system of claim 31, wherein the search component is configured to, for at least one directory of the plurality of directories, map the result to a common result format and aggregating the results having the common result format.

41. The system of claim 31, wherein the server is configured to add the result to an integrated directory, wherein the integrated directory includes a set of contacts coalesced from the plurality of remote directories to form the set of contacts under a common data structure.

42. The system of claim 41, comprising synchronizing the integrated directory between the server and the client device of a user initiating the search.

43. The system of claim 42, wherein the server is configured to receive revisions to contacts of the set of contacts, update the integrated directory to form a revised integrated directory in response to the updates, and synchronize the revised integrated directory with the client device.

44. The system of claim 42, wherein one or more of the server and the client device are configured to receive revisions to contacts of the set of contacts via the client device, and synchronize the revisions with one or more of the plurality of directories.

45. The system of claim 31, wherein one or more of the server and the client device are configured to receive presence and availability information and integrate the presence and availability information into the set of contacts.

46. A computer readable media including executable instructions which, when executed in a processing system, searches multiple directories by:
  receiving a first search query;
  performing a first search of contacts of a plurality of directories using the first search query, the first search including a remote search of a first remote directory that represents contacts under a first data structure;
  mapping the first search query to second search query that can be processed by a second directory that represents contacts under a second data structure different than the first data structure;
  performing a second search of the second directory using the second search query;
  converting results of the first and second searches into a plurality of contact objects having a common data structure;
  generating an integrated contact directory comprising the plurality of contact objects; and
  displaying the integrated contact directory;
  following the generating the integrated contact directory, receiving a third search query from an associated user;
  receiving search instruction data associated with the third search query from the associated user;
  directing the third search against a one of the second directory or the integrated contact directory selected in accordance with the search instructions data;
  performing the third search on the selected directory; and,
  displaying results of the third search to the associated user.

* * * * *